UNITED STATES PATENT OFFICE.

EDMUND TWEEDY, OF DANBURY, CONNECTICUT, AND HENRY L. BREVOORT AND ISAIAH L. ROBERTS, OF BROOKLYN, NEW YORK.

PREPARING FUR FOR FELTING.

SPECIFICATION forming part of Letters Patent No. 339,350, dated April 6, 1886.

Application filed May 20, 1885. Serial No. 166,182. (No specimens.)

*To all whom it may concern:*

Be it known that we, EDMUND TWEEDY, a resident in the town of Danbury, county of Fairfield, and State of Connecticut, and HENRY L. BREVOORT and ISAIAH L. ROBERTS, residents of the city of Brooklyn, county of Kings, and State of New York, all citizens of the United States, have invented new and useful Improvements in Preparing Fur for Felting, of which the following is a full, clear, and exact description, which will enable others skilled in the art to which it appertains to practice and use the same.

Nitrate of mercury has been used for a long time to treat fur, so as to put it in a condition for felting. This material injures the fur, and is injurious to the workmen, both to those who apply it and to those who are engaged in the subsequent operation of making the hats. We have discovered that a solution in water of peroxide of hydrogen, which is a strong oxidizer, can be used to treat the fur and adapt it for felting. We purchase in the market the peroxide of hydrogen, dissolved in water, in a sufficiently diluted form to produce the desired effect, and not so strong as to injure the hands of those using it. This solution we apply to the fur with a brush, or in any other desired way, performing the operation preferably in the same way in which fur is now caroted with nitrate of mercury. We have found good results by using a solution in water of peroxide of hydrogen of the following strength: three and one-half ($3\frac{1}{2}$) per centum, by weight, or fifteen volumes of the gas to one volume of water. This solution must be thoroughly applied to the fur while upon the skin. The skins may be dried at the temperature of the atmosphere or by artificial heat. We think the action which takes place is as follows: Upon the surface of the fur there is some material which is water-repellent. This, when oxidized, loses this quality. By treating fur with peroxide of hydrogen this material is oxidized, and probably made soluble, and the hot water used in the felting operation can reach and come in contact with the fur itself. However, whether this theory is correct or not, the valuable results hereinbefore referred to can be obtained by following the directions contained in this specification.

What we claim, and desire to secure by Letters Patent, is—

1. The process of preparing fur for felting by treating it with a solution of peroxide of hydrogen, substantially as described.

2. As a new article of manufacture, fur prepared for felting with peroxide of hydrogen.

EDMUND TWEEDY.
HENRY L. BREVOORT.
ISAIAH L. ROBERTS.

Witnesses:
JOSEPH L. LEVY,
B. T. VETTERLEIN.